UNITED STATES PATENT OFFICE.

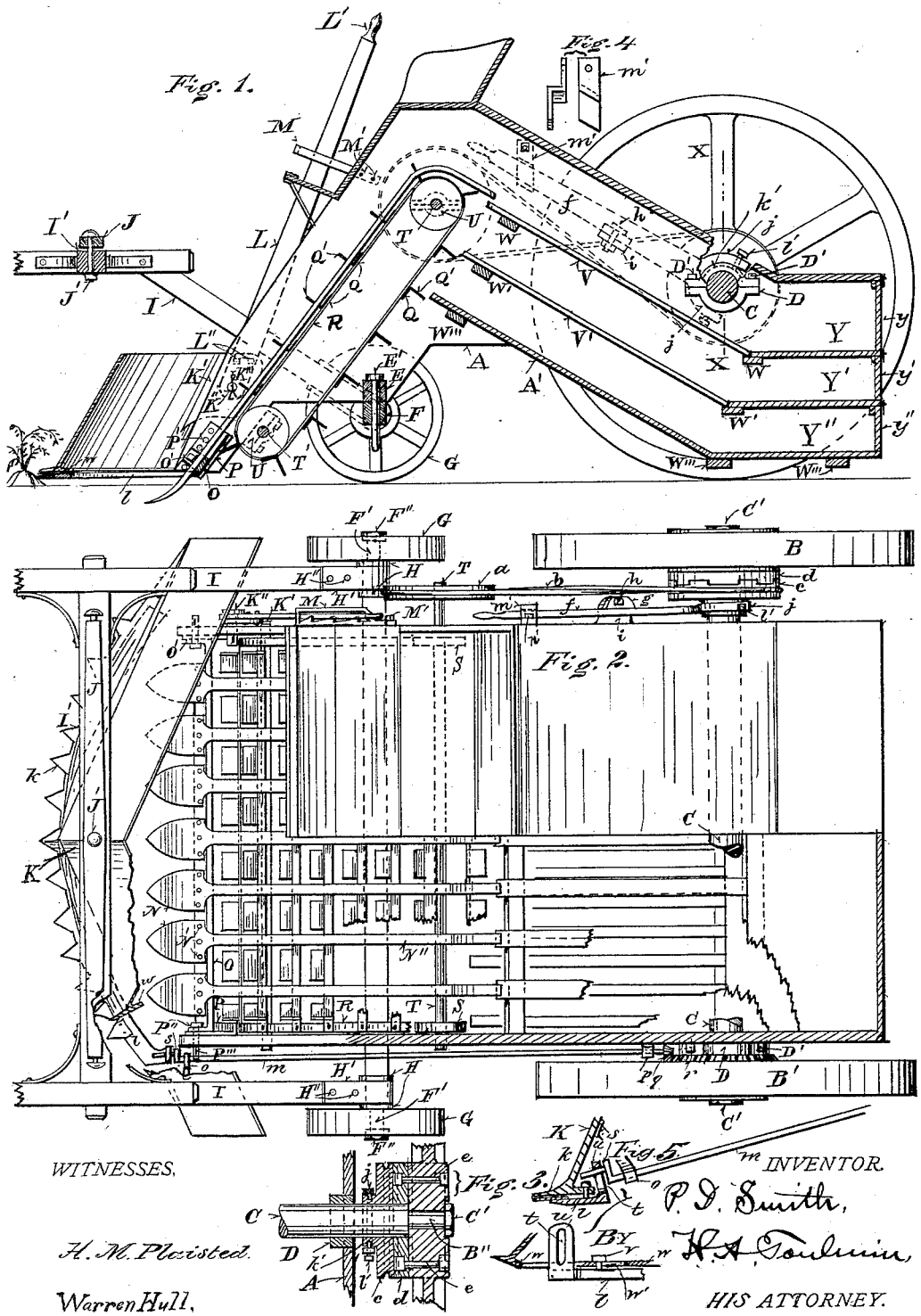

PETER D. SMITH, OF SPRINGFIELD, OHIO.

POTATO-DIGGER.

SPECIFICATION forming part of Letters Patent No. 445,206, dated January 27, 1891.

Application filed August 18, 1890. Serial No. 362,255. (No model.)

*To all whom it may concern:*

Be it known that I, PETER D. SMITH, a citizen of the United States, residing at Springfield, in the county of Clark and State of Ohio, have invented certain new and useful Improvements in Potato-Diggers, of which the following is a specification, reference being had therein to the accompanying drawings.

My invention relates to certain new and useful improvements in potato-diggers; and the object is to provide a means for harvesting potatoes safely, rapidly, and profitably, and to separate them into grades of different sizes by the aid of machinery, whereby the value of the crop may be more easily ascertained, a purchaser more readily found, and less waste result from cut and unharvested potatoes as occurs when harvested by the usual method.

In the accompanying drawings, forming a part of this specification, and on which like reference-letters indicate corresponding parts, Figure 1 represents a vertical longitudinal section of the potato-digger; Fig. 2, a plan view, with casing partly removed, and having portions of the machine broken away to show the construction; Fig. 3, a vertical section of a portion of the machine on the line X X of Fig. 1; Fig. 4, a side and a front view of a lever-catch detached, and Fig. 5 details showing a connection of the cutter-bar and scraper.

The letter A represents the frame of a potato-digger, the rear end of which is carried by two rear wheels B B', turning on journals B'' on an axle C, and held in position by nuts C'. The said axle C passes through clamps D in the frame A, which clamps are tightened on the axle by the bolts D'. Other suitable means of connection may be employed. The forward bolster E of the frame A is preferably pivoted at its center by the pin E' to the forward axle F, which has wheels rotatably mounted on journals F' and held by nuts F'' in like manner to the rear wheel aforesaid, or otherwise, if desired. Between collars H on said axle F are movably mounted straps or yokes H', firmly secured by bolts H'' to the rear ends I of a pair of strongly-braced thills, having a whiffletree J centrally pivoted by a bolt J' to the middle of the cross-piece I, whereby a horse or other draft-animal is attached to draw the machine.

An inclined scraper K, extending low down across the front of the frame, has lugs K' projecting from its inner face, each pivoted to the forward lower end of the frame A by the pin K', secured by a split key K'''. The front of this scraper at its lower edge is provided with a series of teeth $k$, below which reciprocates a cutter-bar $l$, preferably by means of a crank-rod $m$, carried in brackets $o$ and $p$, the latter conveniently adjustable up and down to engage and disengage the pinion $q$ with and from the wheel $r$, conveniently secured to the rear wheel B' or otherwise. The connection of the crank end $s$ with the cutter-bar is preferably by means of a slot $t$ in a vertical extension $u$ of said bar, whereby the rotation of the crank-rod will cause the cutter-bar to reciprocate back and forth under the overhanging knife-blades $k$, being conveniently secured in proximity thereto by means of pins $v$, secured to said bar and engaging with the flange $w$ of the scraper through the slotted openings $w'$ to allow of said reciprocal motion of said cutter-bar. The function of this scraper and cutter attachment is to cut the stalks of the potato-vines from the hills and to clear away the same to prevent them from interfering with the subsequent action of the machine. A lever L has a handle L' on its upper end, and is secured at its lower end to one of the said lugs K' by bolts or rivets L'', and by the corresponding pin K'', before mentioned. A guide M with projections on one side surrounds the said lever near the upper end thereof, and is secured to the frame A by bolts M', whereby the scraper is adjusted to move its front end to and from the ground by operating said handled lever. The lever is secured at the desired inclination by projections in said guide, which intercept the same, as shown in Fig. 2.

The series of inclined curved shovels N are secured by rivets N' to a horizontal cross-bar O, or otherwise formed, said bar having a flange O' turned upon each end and adjustably mounted in angle-plates P, each secured to the frame and perforated by a series of holes P', in which fits a pin P'', passing through a corresponding hole in each of the said flanges O', and fastened by a split pin P''' or otherwise, whereby the shovels may be raised or lowered, thereby varying the depth of cut in the ground as the machine is drawn along, or clearing the ground entirely, as is convenient when going to and from the field. The shovels aforesaid have shanks N″, either formed integrally thereon or otherwise, and extending upward and backward to serve as guides for the potatoes after they have been lifted out of the ground by the shovels. A series of horizontal strips Q, each having a number of floats or projections Q′ attached at nearly right angles thereto and extending between the said shanks, are carried parallel to and in close proximity underneath said shanks by endless belts R, carried by rollers or pulleys S, mounted on shafts T and T′, turning in bearings U, supported by the frame A or otherwise, whereby the potatoes are elevated and discharged over the ends of the shanks N″, which are conveniently turned backward to overhang the shaft T, as shown in Fig. 1. The means of giving motion to the shaft T will appear later. Behind the said strips Q are two series of inclined parallel bars or slats V V′, supported on cross-pieces W W′, the series V having about the same spacement between the bars as the shaft-guides N″, before mentioned, so that the potatoes too large to pass between the bars will be guided to the compartment Y, while all the smaller ones will pass between the bars and upon the second series of bars V′, which have a lesser distance between adjacent bars than the first series, so that a medium size of potatoes may be separated and guided to the compartment Y′, while all smaller ones pass between the bars V′, and being received by the bottom A′, supported on cross-pieces W‴, they find their place in the compartment Y″. Access to said compartments may be had by means of the doors y y′ y″, respectively, whereby each grade or size of potatoes may be separately removed therefrom.

On the top of the case of the frame A is a suitable seat and foot-board for the driver, conveniently near the lever-handle L′, so that he may operate the scraper and cutting attachment to accord with the irregularities of the ground. Motion is given to the shaft T by means of a pulley a, mounted on one end thereof, carrying a cross rope or belt b, that connects with one part c of a clutch, said part being adapted to carry said belt, and being rotatably and slidingly mounted near the corresponding end of the axle C, and adapted to engage, when desired, with the other portion d of the clutch, which is secured to the hub of the wheel B by bolts e or otherwise, whereby the motion of the wheel rolling on the ground is transmitted to the elevating strips and projections Q Q′, respectively. A lever f, having a projection g near its center, is pivotally connected by the bolt h with a corresponding bracket i, secured to the frame, and has a bifurcated end, between the arms j of which is fitted the hub part of the said clutch part c, having an annular groove k′ engaging with set-screws l′, projecting through the said arms j, whereby the clutch part c is allowed free rotary motion, but is actually controlled on said shaft by means of the lever f, in order to bring the parts of the clutch into and out of engagement and thus actuate or free the lifting mechanism. Near the other end of said lever f is a catch m′ (shown detached in Fig. 4,) and pivoted by a bolt m′ to the frame A, whereby the lever is held in the desired position.

Having thus fully described my invention, what I claim as new, and desire to secure by Letters Patent, is—

1. In a potato-digger, the combination, with a frame having double bolsters and carrying-wheels, a scraper for the vines, a series of inclined shovel-blades supported next to said scraper and having shanks inclined upward and backward at the top, forming a dirt-screener, of a series of elevating-bars mounted to travel under said shanks and having floats on their lower edges extending up between the shanks, means to operate said bars, whereby all sizes of potatoes are raised and delivered over the ends of said shanks, a series of inclined potato-screens of increasing fineness, one below the other, to receive the potatoes delivered from said dirt-screener, and a compartment-box connected with the lower ends of said potato-screens, each compartment receiving the potatoes from its respective screen and having a rear door giving access thereto, whereby all of the potatoes are sorted into separate lots according to size and may be conveniently removed from the said box.

2. In a potato-digger, the combination, with a frame having double bolsters and carrying-wheels, a scraper supported thereby and having guides, an arched cutter-bar mounted to reciprocate in said guides, a rotatable crank-shaft directly connected at one end to said cutter-bar, and means to rotate it, of a series of shovels adjacent to said scraper and adjustable to vary the depth of action in the ground, a series of strips connected to said shovels and inclined upward and backward, a series of cross-bars Q, having floats Q′, acting on the potatoes from below and the rear, mechanism to cause the same to travel beneath the said inclined strips and deliver the potatoes over the upper ends thereof, a number of inclined screeners B B′, adapted to receive the potatoes delivered thereto and assort the same according to size, and a series of compartments, each connected to its respective screener and having rear doors, whereby each compartment receives potatoes of uniform size, the larger ones being in the upper compartment.

In testimony whereof I affix my signature in presence of two witnesses.

PETER D. SMITH.

Witnesses:
OLIVER H. MILLER,
WARREN HULL.